United States Patent Office 3,752,894
Patented Aug. 14, 1973

3,752,894
ANTI-INFLAMMATORY DICARBOXYLIC ACID ESTER COMPOSITIONS AND METHODS OF USING SAME
Antonio Esteve, Barcelona, Spain, assignor to Laboratorios Del Dr. S.A., Barcelona, Spain
No Drawing. Filed July 11, 1969, Ser. No. 841,115
Int. Cl. A61k 27/00
U.S. Cl. 424—273                                    14 Claims

ABSTRACT OF THE DISCLOSURE

Novel dicarboxylic acid esters and semi-esters of 1,2-diphenyl-4-n-butyl-4-hydroxyalkyl-3,5-dioxopyrazolidines have been found. One of these, the semi-succinate ester of 1,2-diphenyl-4-n-butyl-4-hydroxymethyl-3,5-dioxopyrazolidine, has been found to have particularly desirable therapeutic properties including a high anti-inflammatory activity and low toxicity. This compound can be used as an anti-inflammatory agent and can be administered orally, rectally or partenterally; either alone or in combination with a corticosteroid, in particular with prednisone.

---

This invention relates to novel dicarboxylic acid esters and semiesters of 1,2-diphenyl-4-n-butyl-4-hydroxyalkyl-3,5-dioxopropyrazolidine and to a process for their preparation.

The present invention provides esters and semiesters of the formula:

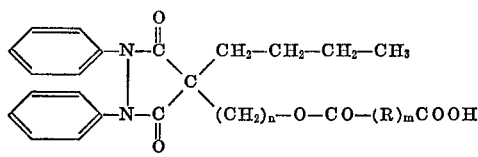

in which R represents one of the radicals —$CH_2$— or —CH.OH— and $n$ and $m$ have a value between 1 and 5 and may be the same or different. The invention also provides pharmaceutical compositions which comprise these compounds. The invention further provides pharmaceutical compoistions which additionally comprise corticosteroids, in particular, prednisolone.

The compounds obtained show outstanding therapeutic properties coupled with a very high activity and a very low toxicity, and they may be used in the treatment of diseases whose development is accompanied by inflammatory symptoms, in particular all forms of rheumatism. They may be administered either alone or in conjunction with other medicaments or pharmaceutically acceptable excipients, either orally, rectally or parenterally. These compounds have the interesting characteristic of being able to neutralise the free carboxyl by a base, thus enabling them to form solutions whose pH-value is close to neutral.

The compounds can also be used in veterinary medicine.

The hydroxyalkylated compound in which $n=1$ (i.e. the hydroxymethyl compound) may be prepared by a conventional method in which a 1,2-diphenyl-3,5-dioxopyrazolidine which is monosubstituted in the 4 position is treated with formaldehyde.

Following its formation this intermediate hydroxyalkylated compound is esterified with a dicarboxylic acid anhydride or chloride in pyridine.

The dicarboxylic acid chloride or anhydride is added directly to the hydroxymethylated compound in solution in pyridine with vigorous stirring, the temperature being kept at 0° C. by means of an adequate bath of ice and salt. The addition is made in an inert atmosphere or if desired in the presence of a stream of nitrogen.

After all the dicarboxylic acid chloride or anhydride has been added under the conditions specified, the reaction product is left to stand for 48 hours, after which it is filtered, recrystallised and dried by conventional methods.

Among the products which can be obtained by the methods described in this specification, a preferred product is the semi-succinate of 1,2-diphenyl-4-n-butyl-4-hydroxymethyl - 3,5-dioxopyrazolidine in whose general formula R=—$CH_2$—, $m=2$ and $n=1$.

Details of the method used to prepare the semi-succinate of 1,2-diphenyl-4-n-butyl-4-hydroxymethyl-3,5-dioxopyrazolidine (this product being designated AE–17 to aid identification) are described in the following as a preferred and illustrative example, without in any way limiting the scope of the invention either in regard to the structure of the compounds which can be obtained by this method, or in regard to the technical modifications or variants which do not affect the nature of these compounds.

EXAMPLE (a) Preparation of 1,2-diphenyl-4-n-butyl-4-hydroxymethyl-3,5-dioxopyrazolidine 308 g. (1 mol) of 1,2-diphenyl-4-n-butyl-3,5-dioxopyrazolidine are boiled under reflux for 2 hours in a mixture of 900 ml. of absolute alcohol and 100 ml. of an aqueous 40% formaldehyde solution. The product is left standing overnight in a refrigerator, giving crystals which are filtered, washed and alcohol and dried, M.P. 146–147° C., weight 305 g. corresponding to a yield of 90%.

(b) Preparation of the semi-succinate of 1,2-diphenyl-4-n-butyl-4-hydroxymethyl-3,5-dioxopyrazolidine 338 g. (1 mol) of the hydroxymethylated derivative of phenylbutazone obtained in accordance with (a) are introduced into a 2-litre three-neck flask equipped with a stirring mechanism, inlet tube and nitrogen inlet, and dissolved in a mixture of 200 ml. of pyridine and 600 ml. of dimethyl formamide. When the temperature of the solution reaches 0° C. by means of cooling with an ice and salt bath, 100 g. (1 mol) of thoroughly powdered succinic anhydride (purged beforehand with a weak stream of nitrogen), are added with stirring in small portions over a period of 30 minutes.

After all the succinic anhydride has been added, the product is stirred for 2 hours until it is completely dissolved, after which the resulting solution is left to stand for 48 hours at room temperature. It is then poured into ice water accompanied by acidification with hydrochloric acid (1:1). The product is then left to stand for 24 hours. filtered, washed repeatedly with water and then once with cold alcohol. Two recrystallisations from the alcohol give 300 g. of a white crystalline powder melting at 126 to 127° C.

PHARMACOLOGICAL DATA OF THE PRODUCT

Toxicity (a) Acute toxicity in mice:
Acute toxicity was determined orally in mice and was compared with phenylbutazone.

RESULTS

| Product | Dose, micromols/kg. | Mortality | $DL_{50}$, micromol/kg. |
|---|---|---|---|
| AE-17 | 1.818 | 0/10 | ±5.683 |
|  | 2.273 | 0/10 |  |
|  | 4.546 | 3/10 |  |
|  | 5.683 | 5/10 |  |
|  | 6.819 | 7/10 |  |
| Phenylbutazone | 3.247 | 5/10 | ±3.247 |

The ratio between the 50% lethal doses is 5.683 : 3.247 = 1.75

This shows that the toxicity of the novel compound AE–17 is 1.75 times lower than that of phenylbutazone.

(b) Acute toxicity in rats:

It was impossible to determine a $DL_{50}$ by virtue of the low toxicity of the product AE–17.

(c) Semi-chronic toxicity:

This toxicity was determined in batches of 10 rats each of which was given different doses of AE–17 and phenyl butazone. One batch was left untreated as a control. The dose was administered orally every day. One weighing was made weekly and the average curve for each batch was traced.

The mortality of the animals treated with AE–17 and phenylbutazone is given below:

RESULTS

| Product | Dose, micromols/kg. | Mortality 3 weeks | 6 weeks |
|---|---|---|---|
| AE–17 | 1.136 | 2/10 | 4/10 |
|  | 568 | 0/10 | 1/10 |
|  | 227 | 0/10 | 0/10 |
| Phenylbutazone | 750 | 4/10 | 6/10 |
|  | 325 | 0/10 | 1/10 |
| Control |  | 0/10 | 0/10 |

It can be seen from these semichronic toxicity tests that the mortality produced by AE–17 is 1.75 times lower than that caused by phenylbutazone.

(d) Teratogenesis:

(1) Pregnant mice.—20 mice weighing from 20 to 22 g. were selected and were kept under observation until they weighed 24 to 26 g. (1 to 2 weeks). They were then mated and administration of the product commenced. Administration was continued orally up to the end of gestation with a dose of 227 micromols per kg.

Results

Mouse No. 1 = 8 normal babies
Mouse No. 2 = 11 normal babies
Mouse No. 3 = 6 normal babies
Mouse No. 4 = 7 normal babies
Mouse No. 5 = 3 normal babies
Mouse No. 6 = 11 normal babies
Mouse No. 7 = 6 normal babies
Mouse No. 8 = 8 normal foetus
Mouse No. 9 = 11 normal foetus
Mouse No. 10 = 6 normal foetus
Average per litter: 7.7
Average for the control mice: 7.5

Three pregnant females were killed 2 to 3 days before the end of gestation. No morphological changes or any regression were noticed in any of the foetus (Mice Nos. 8, 9 and 10).

(2) Pregnant rabbits:

AE–17 was administered orally to pregnant rabbits in a dose of 227 micromols/kg. from the second day of gestation.

Results

Rabbit No. 1 = 7 normal actice babies
Rabbit No. 2 = 5 normal actice babies
Rabbit No. 3 = 7 normal foetus The last rabbit was killed two days before the end of gestation.

Average: 6.3 baby rabbits per litter
Average of control rabbits: 6 babies per litter Conclusion: No morphological differences nor any difference in the number of offsprings were noticed between the baby mice and baby rabbits from the litters treated with the product and the untreated animals (control).

EXPERIMENTAL ACTIVITY (I) Antipholgistic activity:

The antiphlogistic activity of the novel product AE–17 was determined by measuring the change in volume of the paw of a rat treated locally with various phlogogenic agents using a Hillebrecht pletismograph before and after administration of the product under examination.

Material and methods.—Albino rats weighing between 100 and 150 g. were used. An experimental inflammatory reaction was caused on one of the hind paws of the rat by the sub-plantar injection of various phlogogenic agents.

In a series of tests conducted on a different number of animals, some were treated with AE–17 and others with phenylbutazone, an antiphlogistic considered as typical and used as a reference. The tests were carried out simultaneously. In each of these tests, one group of animals was left without antiphlogistic treatment for comparison purposes.

Inhibition of the experimental inflammation, reflecting the antiphlogistic activity of the preparation, is expressed in percent of the values obtained from the control group. Both AE–17 and phenylbutazone are administered orally (probe);

(a) Phlogogenic agents.—15% egg-white solution:

0.1 ml. of 15% egg-white is administered by sub-plantar injection.

The medicaments AE–17 and phenylbutazone (for comparison) are administered orally (probe) to groups of rats two hours before sub-plantar injection of the phlogogenic egg-white solution. Measurements of the volume of the paw of the rat are made 30, 90 and 150 minutes after the phlogogenic injection.

Phenylbutazone and AE–17 were used in equal doses of 150 and 300 micromols/kg. (oral administration).

RESULTS

| Time, mins. | Doses | | | |
|---|---|---|---|---|
|  | AE–17 | | Phenylbutazone | |
|  | 150 micromols/kg. | 300 micromols/kg. | 150 micromols/kg. | 300 micromols/kg. |
| 30 | 18% (2) | 42% (2) | 21% (2) | 41% (2) |
| 60 | 26% (2) | 51% (2) | 23% (2) | 48% (2) |
| 150 | 32% (2) | 55% (2) | 26% (2) | 51% (2) |

The numbers in brackets indicate the number of tests carried out for each product and each dose.

From the 24 groups of tests carried out, it can be seen that all the results obtained with AE–17 were superior to the results obtained with phenylbutazone used for comparison, though the difference in the results remained minimal.

(b) Phlogogenic agents.—0.05 ml. of 10% kaolin suspension:

The medicaments were administered one hour before the experimental inflammation was caused. Measurements of the paw volume relative to this type of phlogogenic agent were made 5, 24 and 48 hours after the sub-plantar injection.

RESULTS

| Time, hours | 150 micromols/kg. | |
|---|---|---|
|  | AE–17 | Phenyl-butazone |
| 5 | 55% (2) | 57% (2) |
| 24 | 53% (2) | 55% (2) |
| 48 | 42% (2) | 42% (2) |

The numbers in brackets indicate the number of tests carried out.

With this type of phlogogenic agent, the results obtained with phenylbutazone are initially better than the results obtained with AE–17 and become equal in the measurements made at 48 hours.

(c) Phlogogenic agents.—0.1 ml. of a 1% carrageen solution:

The medicaments are administered one hour before the phlogogenic injection and the measurements are made 3, 5 and 24 hours after the phlogogenic injection.

RESULTS

| Time, hours | Doses | | | |
|---|---|---|---|---|
| | AE-17 | | Phenylbutazone | |
| | 150 micromols/kg. | 75 micromols/kg. | 150 micromols/kg. | 75 micromols/kg. |
| 3 | 93% (2) | 80% (2) | 98% (2) | 71% (2) |
| 5 | 73% (2) | 73% (2) | 86% (2) | 64% (2) |
| 24 | 92% (2) | 85% (2) | 92% (2) | 87% (2) |

With this type of phlogogenic agent, administered in a dose of 150 micromols/kg., the results are almost equal, being slightly better in the case of phenylbutazone, although with half the dose (75 micromols/kg.) the activity of AE-17 is greater than that of phenylbutazone after 3 and 5 hours.

(II) Antipyretic activity:

This activity was studied in male rats weighing from 100 to 250 g. They were injected with a dose of 1 ml./100 g. of a pyrogenic solution (dried brewer's yeast 15%; gum arabic 2%; sodium chloride 0.9%). After an initial period of 15 hours, the rectal temperature is measured at intervals of one hour. After a period of 3 hours, the rats are given the medicament by oral administration (probe). Their temperatures are again taken 1, 2 and 3 hours after the medicaments have been administered. Aspirin (500 micromols dose) is used as the comparison substance. The doses of AE-17 and phenylbutazone used to conduct this test are half the control dose (i.e., 250 micromols).

RESULTS

| Product | Dose, micromols | Antipyretic activity (percent) |
|---|---|---|
| Aspirin | 500 | 100 |
| AE-17 | 250 | 85 |
| Phenylbutazone | 250 | 71 |

These results show that the antipyretic activity of AE-17 is almost double that of aspirin (double the dose) and one-fifth greater than that of phenylbutazone.

(III) Analgesic activity:

This activity was also determined by comparison with phenylbutazone using the method developed by Van der Wende and modified by Eckhardt et al.

This method comprises producing a painful syndrome with intermittent contorsions of the abdomen of the animal on the bottom of the cage and extension of the hind paws by intraperitoneal injection of dilute HCl.

The aforementioned convulsions are inhibited by the medicaments administered.

Extending agent: HCl in 10% aqueous solution, dosage (administered intraperitoneally) 0.25 ml. per mouse weighing 20 g.

The effect is immediate after the injection. The medicament has been administered two hours previously (orally). The normal period for determining the presence or absence of extension is 10 minutes. The extension which the control group undergoes is taken as 100% for reference.

Results

The results are expressed in the number of positive animals in which the extending effect was inhibited by the action of the medicament under examination, and are given in percentage of inhibition.

| Product | Doses, micromols/kg. | Number of positive animals | Percentage inhibition | Positive animals/10 |
|---|---|---|---|---|
| AE-17 | 455 | 14/40 | 35 | 3.5/10 |
| | 582 | 16/40 | 40 | 4/10 |
| | 910 | 28/40 | 70 | 4/10 |
| Phenylbutazone | 325 | 14/40 | 35 | 3.5/10 |
| | 750 | 20/40 | 50 | 5/10 |
| | 1,300 | 28/40 | 70 | 7/10 |

The Reed-Muench method is used to determine the $DE_{50}$. The logarithm of the dose is plotted as abscissa and, as ordinate, the percentage inhibition expressed in units of probability (probits) after calculation of the average of the results obtained in respect of the positive animals. It is possible in this way to obtain a corrected curve from which the $DE_{50}$ is derived.

| Doses, micromols/kg. | Percent positive (+) | Percent negative (−) | Percent accumulated | | | Ratio | Percent |
|---|---|---|---|---|---|---|---|
| | | | (+) | (−) | Total | | |
| Product: AE-17 | | | | | | | |
| 455 | 35 | 65 | 35 | 155 | 190 | 35/190 | 18.4 |
| 682 | 40 | 60 | 75 | 90 | 165 | 75/165 | 45.5 |
| 910 | 70 | 30 | 145 | 30 | 175 | 145/175 | [1] 83 |
| Product: phenylbutazone | | | | | | | |
| 325 | 35 | 65 | 35 | 145 | 180 | 35/180 | 19.4 |
| 750 | 50 | 50 | 85 | 80 | 165 | 85/165 | 51.5 |
| 1,300 | 70 | 30 | 155 | 30 | 185 | 155/185 | [2] 88.3 |

[1] $DE_{50}=682$ micromols/kg. of mouse (oral).
[2] $DE_{50}=750$ micromols/kg. of mouse (oral).

AE-17 has a greater analgesic activity than phenylbutazone. The therapeutic analgesic index of mice in the case of AE-17 is 5.683/682=8.3, whilst the therapeutic analgesic index of the same animal in the case of phenylbutazone is 3.247/750=4.3.

It can be seen from the comparison of the different pharmacological tests described that AE-17 is an excellent anti-rheumatismal medicament which is just as effective as phenylbutazone, surpassing phenylbutazone in its antipyretic analgesic activity and also in its anti-phlogistic activity where the phlogogenic agent used in the tests in egg-white or carrageen.

USE OF THE COMPOUNDS WITH CORTICOSTEROIDS

From the knowledge of the beneficial results that are frequently obtained by associating basic antiphlogistic medicaments with substances of different constitution such as corticosteroids it was assumed that favourable effects would be obtained if a corticosteroid which has been as extensively studied as prednisone, were to be added to the tested product. By a synergistic effect such as this it is possible to reduce the doses of medicaments administered, and hence there is a reduction in the probability of unfavourable secondary reactions occurring. This would also justify the addition of a medicament which in many cases is administered as an antiphlogistic in a much higher dose than in the tested synergistic mixture.

Acute toxicity: AE-17+prednisone (50:1), administered orally to mice.

DOSES USED

AE-17 1,500 mg./kg. + prednisone 30 mg./kg.=total of 1,530 mg./kg.
AE-17 2,000 mg./kg. + prednisone 40 mg./kg.=total of 2,040 mg./kg.
AE-17 2,500 mg./kg. + prednisone 50 mg./kg.=total of 2,550 mg./kg.
AE-17 3,000 mg./kg. + prednisone 60 mg./kg.=total of 3,060 mg./kg.

REED-MUENCH METHOD

| Doses, mg./kg. | Number | | Cumulative numbers | | | Ratio | Percent |
|---|---|---|---|---|---|---|---|
| | D | A | D | A | T | | |
| 1,530 | 4 | 6 | 4 | 27 | 31 | 4/31 | 12.9 |
| 2,040 | 2 | 8 | 6 | 21 | 27 | 6/27 | 22.2 |
| 2,550 | 3 | 7 | 9 | 13 | 22 | 9/22 | 40.9 |
| 3,060 | 4 | 6 | 13 | 6 | 19 | 13/19 | 68.4 |

The letters A and D, respectively, denote the number of live and dead animals, whilst the letter T denotes the total of the results.

By plotting as the abscissa the logarithm of the dose and as ordinate the percent mortality converted into units of probability (probits), a corrected curve is obtained from which a $DL_{50}$ of 2652 mg./kg. is derived in respect of the association of AE–17 with prednisone (50:1). This $DL_{50}$ is extremely favourable by comparison with the $DL_{50}$ of the association of phenylbutazone with prednisone, as can be seen from the following comparison:

$DL_{50}$ of AE–17 plus prednisone=2652 mg./kg.
$DL_{50}$ of AE–17=2500 mg./kg.
$DL_{50}$ of phenylbutazone plus prednisone=1000 mg./kg.

Accordingly, the acute toxicity of the mixture of AE–17 and prednisone is at least 2.5 times lower than that of the mixture of phenylbutazone with prednisone.

In view of the toxicity and therapeutic activity characteristics given above, it is clear that, the synergism of these medicaments is such that this mixture has an antiphlogistic activity not only greater than that of AE–17 administered on its own, but also greater than that of the mixture of phenylbutazone plus prednisone which is frequently used. By virtue of this greater activity, both the novel antiphlogistic compounds and prednisone may be administered in doses lower than those which would have to be given where each of these medicaments to be used separately (in practice a dose can be reduced by half), which in practice is reflected in greater clinical tolerance.

In addition to the advantages referred to above, there is the lower toxicity (by a factor of two) of the novel mixture. Accordingly, the use of a mixture of AE–17 and prednisone is a more effective antiphlogistic and antirheumatismal medicament with a greater therapeutic margin. This mixture is presented as a powerful atoxic new medicament which may be used in anti-rheumatismal therapy.

PHARMACEUTICAL FORMS

The compounds themselves, and also the mixtures, i.e. with substances such as corticosteroids, may be administered either orally in the form of gelatin-coated pills, lozenges or tablets, or rectally in the form of suppositories, or even parenterally in the form of ampoules (in which case the compounds are used pure). These pharmaceutical forms are prepared by conventional methods and they may be associated with any conventional pharmaceutically acceptable inert substances.

The recommended doses and the modes of administration of the doses are given out in the following table:

discrete functional impotence which made it difficult for him to walk. In recent weeks, the pain has become very acute both in the digital joints of his hands and in his feet, making it impossible for him to walk. Asthenia and hyporeflexia.

Examination: The hands and feet are discretely oedematous with an intense pain during movement and slight local heat. No signs of redness. Walking is extremely painful. Examination of the lungs and heart does not show any anomaly. Weight: 87 kg. Blood pressure 160–80.

Analysis: Uricaemia rate 9 mg. percent.

Haemogram: haematids 4,150,000; leucocytes 8,900.
Formula: crescents=3; segments=64, lymphocytes=28, monocytes=2.
V.S.C.: 32–66.

Diagnosis: Gouty polyarthritis affecting the finger and toe joints.

Treatments: AE–17 in capsules (gelatin-coated): dosage: 2 capsules per day, each containing 200 mg. of active principle.

Evolution: After 15 days' treatment, the improvement in the patient is evident. The pains have completely disappeared while at rest, although there is still some slight pain with walking. The patient is able to tighten his hands perfectly without suffering any pain. No pain felt when examined by auscultation. The inflammation has disappeared. Appetite increased. Weight 87.5 kg. Blood pressure 160–80.

Analysis: Uricaemia rate: 7.1 mg. percent.

Haemogram: haematids 4,100,000; leucocytes 9,800.
Formula: crescents=3; segments=65; lymphocytes=30; monocytes=2.
V.S.G. 20–48.

Tolerance: Excellent; no digestive difficulties or dermic difficulties or difficulties of any other kind.

Case No. 2 (gelatin-coated pills)

Name: M.O.B.; age 59 years; sex female.
Family history: Father alive and well. Mother died aged 40 following an accident. Husband and two sons, alive and well.
Personal pathological history: Ovariectomy at 54 years; obesity.
Present sickness: 5 years previously, the patient had begun to suffer from interphalangeal pains in both hands, with a discrete functional impotence making it difficult for her to close her hands completely. Pain in the shoulder accompanied by slight functional impotence. Painful

| Administration | AE–17 on its own | AE–17 plus prednisone |
|---|---|---|
| Oral | Single dose: 150 to 300 mg / Daily dose: 300 to 1,800 mg | Single dose: 50 to 150 mg. of AE–17: 0.5 to 5 mg. of corticosteroid.[1] / Daily dose: 150 to 900 mg. of AE–17: 1 to 30 mg. of corticosteroid.[1] |
| Rectal | Single dose: 250 to 500 mg / Daily total: 250 to 100 mg | Single dose: 100 to 250 mg. of AE–17: 1 to 5 mg. of corticosteroid.[1] / Daily total: 100 to 500 mg. of AE–17: 1 to 10 mg. of corticosteroid.[1] |
| Parenteral | Single dose: 250 to 500 mg / Daily total: 250 to 1,000 mg | |

[1] Depending upon the type of corticosteroid.

The following case histories illustrate the value of the compounds according to the invention.

CLINICAL RESULTS OBTAINED WITH THE PURE PRODUCT

Case No. 1 (gelatin-coated capsules)

Name: A.A.M.; age 65 years; sex male.
Family history: Father died aged 89 for unknown causes; mother died aged 53 from renal sclerosis. One healthy daughter.
Personal pathological history: Anal eczema, renal lithiasis at 55, double inguinal hernia (operated).
Present sickness: Some 3 to 4 months previously, the patient began to suffer from pain spreading throughout the small joints of his hands and feet, accompanied by a discomfort in the cervical region. Over the five-year period, the pains disappeared or got more acute periodically. Treatment with various anti-rheumatismal preparations based on pyrazolidines and corticosteriods with irregular results.

Examination: Psoriasiform dermic manifestations in the flexural regions of the limbs. Pains accompanying movement of the interphalangeal joints of the hands, with discrete swelling and difficulties in tightening. Pains accompanying contact of the cervical vertebrae. Obesity. Normal cario-respiratory examination. Weight: 85 kg., blood pressure 160–80.

Analysis:

Haemogram: haematids 4,900,000; haemoglobin 86%; leucocytes 6400.

Formula: crescents=3; segments=65; lymphocytes=31; monocyte=1.
V.S.G. 5–13.

Diagnosis: Chronic evolutive polyarthritis. Psoriasis.
Treatment: AE–17 gelatin-coated pills; dosage 2 capsules per day each containing 200 mg. of active principle.

Evolution: After 20 days' treatment, the pains have disappeared. The patient can close her hands properly. The cervical pains have disappeared. The antiphlogistic action is evident as is the analgesic action, which the patient rates greater than that of other medicaments she had previously been given. Weight 84 kg. Blood pressure 160–80.

Analysis:

Haemogram: haematids 4,700,000, haemoglobin 84%, leucocytes 5,500.
Formula: crescents=3, segments=72, lymphocytes=20, monocytes=5.
V.S.G. 9–27.

Tolerance: Excellent. There is no secondary reaction of any kind.

Case No. 3 (suppositories)

Name: M.A.P.; age 67 years; sex female.
Family history: Father died aged 60 from neoplasm of the prostate, mother died aged 72 from cardiac failure.
Personal pathological history: Normal except for recurring bronchitis in the winter months.
Present sickness: For some 3 to 4 months, the patient has been suffering from pains in her left knee, especially when walking and descending stairs. The pain disappears at rest. Discrete functional impotence of the knee. "Creaking" occurs when the patient is walking.
Examination: Discrete obesity (72 kg.). No signs of inflammation, redness or swelling of the knee. Pain suffered on contact. Creaking during movement.
Weight 73 g. Blood pressure 160–80.
Analysis:

Haemogram: haematids 4,100,000, haemoglobin 82%, leucocytes 6100.
Formula: crescents=2, segments=73, lymphocytes=22, monocytes=3.
V.S.G. 25–55.

Diagnosis: Gonarthrocace in the left knee.
Treatment: AE–17 in suppository form: dosage 1 suppository per day, each containing 500 mg. of active principle.
Evolution: Great improvement in the knee pains after 16 day's treatment. Walking is easier and almost painless.
Weight 72 kg., blood presure 160–80.
Analysis:

Haemogram: haematids 3,950,000, haemoglobin 73%, leucocytes 5600.
Formula: crescents=2, segments=62, lymphocytes=35, monocyte=1.

Tolerance: Excellent, both locally and generally.

Case No. 4 (suppositories)

Name: M.M.C.; age 68 years, sex female.
Family history: Father died aged 73 (Ictus), mother died at 53 from chronic asthma. One son alive and well.
Personal pathological history: Typhoid at 38 years. Ovariectomy at 52 years. Colecystectomy at 58 years. Hypertension for 6 years.
Present complaint: For 1½ years, the patient has been suffering from imprecise pain in her left hand, especially under strain. No signs of local inflammation. Over recent weeks, the pains consecutive upon movement have increased considerably. There are no painful symptoms in other regions.

Examination: Pain on contact and above all during movement of the wrist joint. No oedematous reaction. Examination normal in other respects, except for chronic hypertension. Weight 65 kg., blood pressure 210–100.
Analysis:

Haemogram: haematids 4,500,000, haemoglobin 78%, leucocytes 14, monocytes 5.
V.S.G.=16–30.

Diagnosis: Rhizarthrosis in the left hand.
Treatment: AE–17 in suppositories: dosage 1 suppository per day, each containing 500 g. of active principle. Hypotensor: reserpine+chlorodiazidic derivative.

Evolution: After 16 days, the pains have completely disappeared. Movement is easy and almost painless. The analgesic activity of the medicament is evident. Weight 64 kg., blood pressure 180–90 (allowing for the treatment with a hypotensor and diuretic).
Analysis:

Haemogram: haematids 4,650,000, haemoglobin 80%, leucocytes 6200.
Formula crescents=5, segments=71, lymphocytes=18, monocytes=6.
V.S.G. 14–28.

Tolerance: No side effects.

CLINICAL RESULTS OF THE PRODUCT AE–17 IN ASSOCIATION WITH PREDNISONE

Case No. 1 (gelatin capsules)

Name: M.R.R.: age 62; sex female.
Family history: Father died aged 82 from chronic asthmatic bronchitis. Mother in good health. Husband and three sons in good health.
Physiological history: Digestive physiology with a tendency towards constipation. Normal renal physiology. Irregular appetite. Menopause at 48 accompanied by vasomotor disorders.
Pathological history: Some recurring tonsilitis and rheums.
Present complaint: For 2 years and without any apparent cause, the patient has been suffering from bilateral gonalgia which increases when she descends stairs and during the first few steps' walking. Blocking sensation in both knees; creaking. The pain disappears at rest.
Examination: Normal circulatory system. Normal respiratory system. Digestive system: there are no painful spots in the abdomen which is soft and depressed. Locomotor system: globular knees. There is not evidence of articular effusion. Strasser test positive. Painful eyelids. Prerotular hygroma of the right side. Good mobility, although somewhat painful.
Radiological examination: Marginal osteophytes, sclerosis, rotular displacement and internal "catching."
Diagosis: Arthrosis in both knees.
Treatment: AE–17 (150 mg.)+prednisone (3 mg.) in gelatin capsules: dosage 3 capsules per day.
Evolution: After 12 days' treatment, the pain has decreased considerably during walking. The pain reappears at the end of the treatment and disappears again on resumption of the treatment.
Tolerance: Excellent. There is no sign of digestive trouble or any other kind of side effect.

Case No. 2 (gelatin capsules)

Name: C.R.T.: age 59 years; sex female.
Family history: Father died aged 82 from unknown causes. Mother died aged 76 from neoplasm of the breast. Husband and 6 sons in good health.
Physiological history: Normal digestiv physiology; good appetite. Normal renal physiology. Sleeps well except when in plain. Menopause at 50 years.

Pathological history: Pneumonia at 51. Frequent rheums. Tonsillectomy at 45.

Present sickness: Fourteen years ago, after the tonsillectomy, the patient began to suffer from a generalised painful polyarticular syndrome as a result of which she was occasionally confined to bed. After 15 days, the syndrome worsened with signs of swelling in both hands and feet, accompanied by a tendency towards deformation. The patient is at present in an advanced state of chronic polyarticular rheumatism which frequently prevents her from walking and makes it difficult for her to move her hands.

Diagnosis: Advanced evolutive chronic polyarthritis (E.C.P.).

Treatment: AE–17 (150 mg.)+prednisone (3 mg.) in gelatin capsules: dosage 3 capsules per day.

Evolution: Improvement in the pain affecting the hands and feet. Discrete increase in articular mobility after 12 days' treatment. It is pointed out that this patient had previously undergone intensive treatment with all kinds of anti-rheumatismal preparations.

Tolerance: Excellent, no side effects.

Case No. 3 (suppositories)

Nam: A.R.P.; age 60 years; sex, female.

Family history: Father died aged 68 from unknown causes. Mother died at 58 from apoplectic ictus.

Physiological history: Normal digestive physiology. Discrete nictury. Good appetite and normal thirst. Menopause at 51. Insomnia.

Pathological history: Frequent rheums, left nephrectomy following a renal infection according to the patient. Discrete obesity.

Present complaint: Two years ago and without any apparent cause, the patient began suffering from pains in her left knee which increases when climbing and descending stairs and during the initial stages of walking. The pain disappears at rest. Creaking is noticeable in both knees with an articular blocking sensation in the left knee.

Examination: Normal circulatory system. Normal respiratory system. Digestive system: dental caries, rest normal. Locomotor system: globular left-hand knee. Strasser test positive. No articular effusion. Pain when pressure is applied to the eyelid. Creaking during movement. Varicosities in both legs.

Radiological examination: Marginal osteophytes. Sclerosis. Decrease in the articular space.

Diagnosis: Arthrosis of the left knee.

Treatment: AE–17 (250 mg.)+prednisone (5 mg.) in suppository form: dosage 1 suppository per day.

Evolution: After 16 days' treatment, the patient feels a great improvement with the pains completely disappearing from the affected knee.

Tolerance: Excellent, no local or general trouble.

Case No. 4 (suppositories)

Name: J.S.R.; age 62 years; sex, male.

Family history: Father died aged 72 from congestive cardiopathy. Mother died aged 77 from cadiopathy. Brother in good health.

Physiological history: Normal digestive physiology, excellent appetite, intense thirst. Normal renal psysiology. Obesity. Smoker (6 cigars a day).

Pathological history: Recurring tonsillitis, various hepatic and nephretic colic crises.

Present complaint: Thirty years ago, as a result of recurring pain, the patient was given a radiographic examination which revealed the presence of an "ivory" vertebra. Paget's disease diagnosed. Since then, frequently recurring intense crises of pain. Recurring cephalitis unreceptive to treatment occurring periodically. Diffuse polyarthralgia in the two upper exremities. Apart from these syndromes, the patient suffers from cervical and dorsal pain of an arthrosic kind.

Examination: Normal circulatory system. Respiratory system: some rough wheezing at the bottom of the lungs. Digestive system: bad dental state with pyorrhoea. Slight pain under pressure in the right hypochondrium. Rest normal. Locomotor system: dorsal kyphosis. Slight pain on contact in the lumbar column with limitation of mobility. Cervical mobility also limited.

Radiological examination: Vertebra LIV in "ivory." The osiliacs affected with condensation zones. Head: enlarged diploe. Arthrosic lesions of the cervical and dorsal column. Increased phosphatases.

Diagnosis: Paget's disease. Cervical and dorsal arthrosis.

Treatment: AE–17 (250 mg.)+prednisone (5 mg.) in suppository form, one suppository per day.

Evolution: Complete improvement in the outbursts of pain after 12 days' medication. Logically, the main process (Paget) which has evolved extraordinarily slowly over a period of 30 years, does not undergo any modification.

Tolerance: Excellent.

What I claim is:

1. An anti-inflammatory composition which comprises an effective anti-inflammatory amount of a compound of the formula:

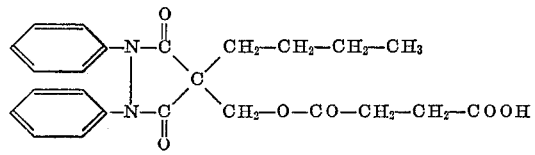

in an acceptable pharmaceutical carrier.

2. The composition of claim 1 in a dosage unit for oral administration.

3. The composition of claim 1 in a dosage unit for oral administration, said dosage unit containing 150 to 300 mg. of said compound.

4. The composition of claim 1 in a dosage unit for rectal administration.

5. The composition of claim 1 in a dosage unit for rectal administration, said dosage unit containing 250 to 500 mg. of said compound.

6. The composition of claim 1 in a dosage unit for parenteral administration.

7. The composition of claim 1 in a dosage unit for parenteral administration, said dosage unit containing 250 to 500 mg. of said compound.

8. An anti-inflammatory composition comprising an effective anti-inflammatory amount of the semi-succinate ester of 1,2-diphenyl-4-n-butyl-4-hydroxymethyl-3,5-dioxopyrazolidine and from 0.5 to 5 mg. of prednisone in an acceptable pharmaceutical carrier.

9. The composition of claim 8 in a dosage unit for oral administration containing 50 to 150 mg. of the semi-succinate ester of 1,2 - diphenyl-4-n-butyl-4-hydroxymethyl-3,5-dioxopyrazolidine and 0.5 to 5 mg. of prednisone.

10. The composition of claim 8 in a dosage unit for rectal administration containing 100 to 250 mg. of the semi-succinate ester of 1,2-diphenyl-4-n-butyl-4-hydroxymethyl-3,5-dioxopyrazolidine and 1 to 5 mg. of prednisone.

11. A method of treating inflammation in animals which comprises the administration to said animals of an effective anti-inflammatory amount of the semi-succinate ester of 1,2-diphenyl-4-n-butyl-4-hydroxymethyl-3,5-dioxopyrazolidine in an acceptable pharmaceutical carrier.

12. The method of claim 11 wherein the composition is administered orally and contains from 150 to 300 mg. of the semi-succinate ester of 1,2-diphenyl-4-n-butyl-4-hydroxymethyl-3,5-dioxopyrazolidine.

13. The method of claim 11, wherein the composition administered additionally contains from 0.5 to 5 mg. of prednisone.

14. The method of claim 11 wherein the composition is administered rectally or parenterally and contains from 250 to 500 mg. of the semi-succinate ester of 1,2-diphenyl-4-n-butyl-4-hydroxymethyl-3,5-dioxopyrazolidine.

References Cited

UNITED STATES PATENTS

| 1,915,334 | 6/1933 | Salzberg et al. | 260—243 |
| 2,075,359 | 3/1937 | Salzberg et al. | 424—250 |

OTHER REFERENCES

Chemical Abstracts, 72:24648e (1970).

JEROME D. GOLDBERG, Primary Examiner

V. D. TURNER, Assistant Examiner

U.S. Cl. X.R.

260—310 B